United States Patent [19]
Medlin

[11] Patent Number: 5,595,418
[45] Date of Patent: Jan. 21, 1997

[54] SELECTIVELY LIFTABLE CARGO BED ENCLOSING SYSTEM

[76] Inventor: Eric G. Medlin, 3721 S. Dennis Dr., Tempe, Ariz. 85282

[21] Appl. No.: 523,957

[22] Filed: Sep. 6, 1995

[51] Int. Cl.⁶ .................................................. B60P 7/02
[52] U.S. Cl. ......................... 296/100; 296/165; 296/167
[58] Field of Search ................................... 296/100, 101, 296/164, 165, 167, 176, 26

[56] References Cited

U.S. PATENT DOCUMENTS

| | | | |
|---|---|---|---|
| 2,912,276 | 11/1959 | Schwartz et al. | 296/100 |
| 3,591,230 | 7/1971 | Cramer | 296/23 |
| 3,823,975 | 7/1974 | Cooper | 296/23 R |
| 3,923,334 | 12/1975 | Key | 296/100 X |
| 4,101,162 | 7/1978 | Koehn | 296/100 |
| 4,372,568 | 2/1983 | Campbell | 280/63 |
| 4,756,571 | 7/1988 | Lake | 296/100 |
| 5,058,946 | 10/1991 | Faber | 296/181 |
| 5,102,185 | 4/1992 | Lake | 296/100 X |
| 5,104,175 | 4/1992 | Enninga | 296/100 |
| 5,403,061 | 4/1995 | Micknowicz | 296/100 |

*Primary Examiner*—Joseph D. Pape
*Attorney, Agent, or Firm*—Meschkow & Gresham, P.L.C.

[57] ABSTRACT

A camper shell (12) attaches to a cargo bed (16) of a pickup truck (14) through a hinging mechanism (50). The hinging mechanism (50) resides within the shell (12) and causes the entire shell (12) to move rearward and upward as the shell (12) pivots upward. The hinging mechanism (50) includes upper arms (52), lower arms (54) and a counterbalancing spring (66, 76). The upper arms (52) are longer than the lower arms (54), and the upper arms (52) pivotally attach to the shell (12) at pivot points (58) which are spaced apart from and above the pivot points (62) where the lower arms pivotally attach to shell (12). The upper arms (52) pivotally attach to the cargo bed (16) at pivot points (56) that are spaced apart from and rearward of the pivot points (60) where the lower arms (54) pivotally attach to the cargo bed (16). The counterbalancing spring (66, 76) urges the shell to pivot upward.

20 Claims, 3 Drawing Sheets

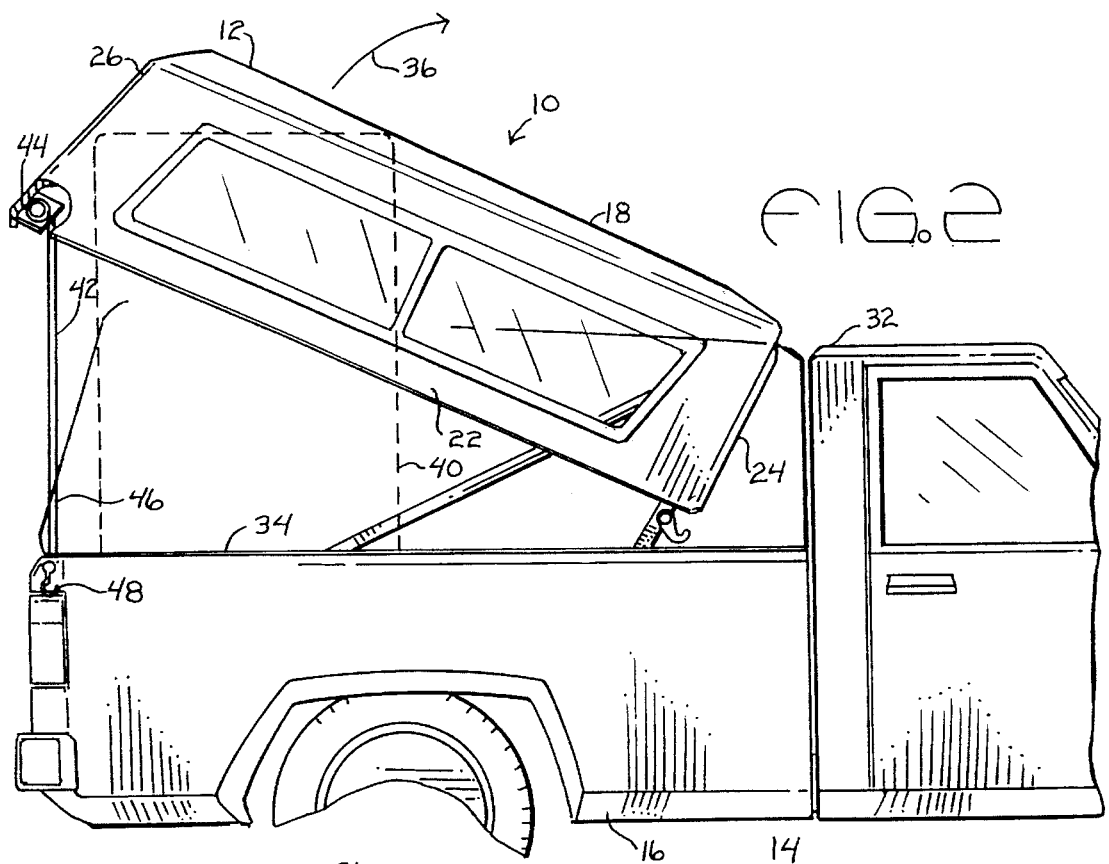

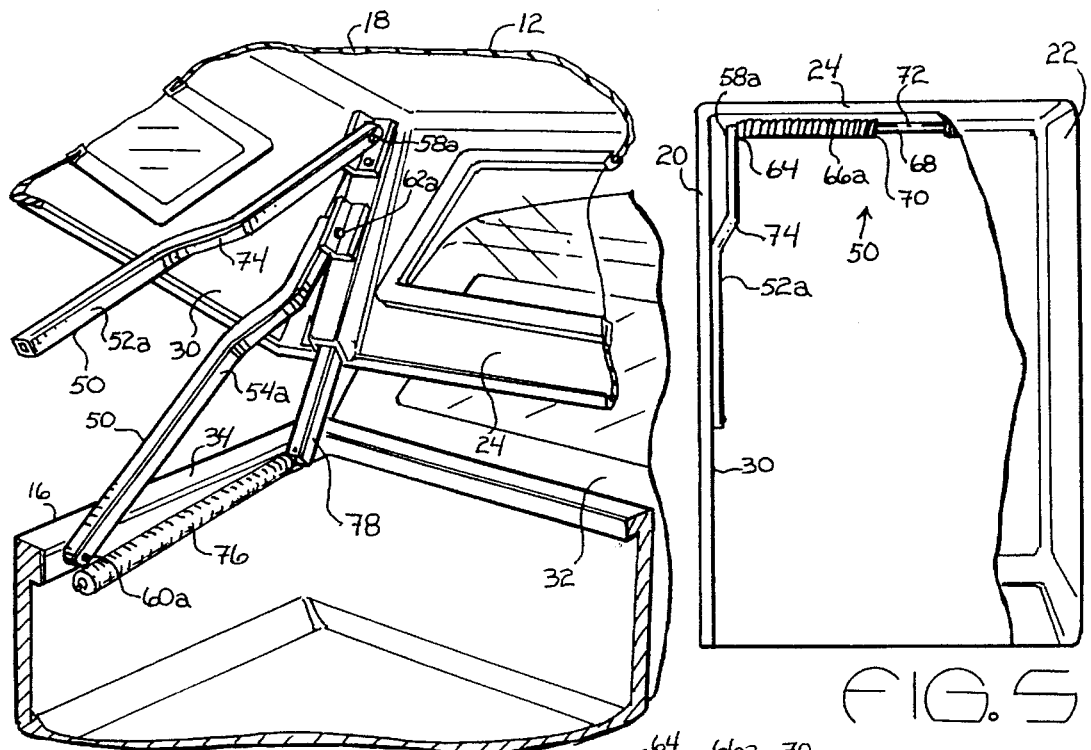
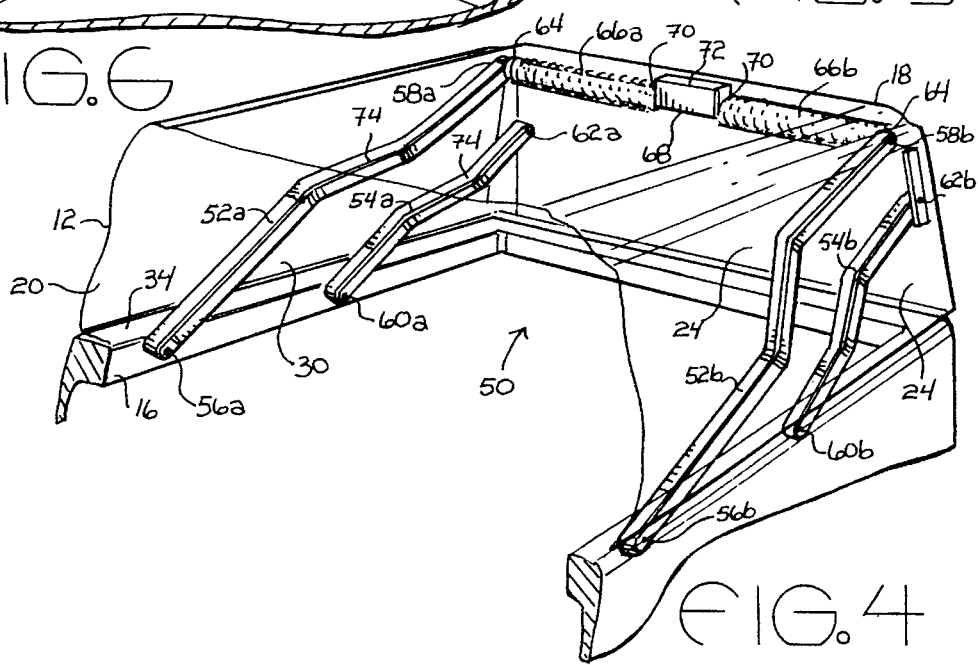

SELECTIVELY LIFTABLE CARGO BED ENCLOSING SYSTEM

TECHNICAL FIELD OF THE INVENTION

The present invention relates generally to camper shells and other devices for enclosing cargo beds of pickup trucks and other vehicles. More specifically, the present invention relates to such devices as are configured to be selectively lifted away from a lowered position on top of the cargo bed.

BACKGROUND OF THE INVENTION

Many owners of pickup trucks find that an open cargo bed does not meet their needs. Accordingly, the installation of camper shells on pickup trucks has become a popular technique for enclosing pickup truck cargo beds. Camper shells obviate any need for tieing down loose cargo which might otherwise be blown out of the cargo bed by the wind, protect the cargo from the weather, and enhance security for the cargo.

While a camper shell may often be a desirable pickup truck accessory, it is also a nuisance at times. Such times may occur when an owner wishes to clean or otherwise access the front region of the cargo bed. The confined spaces of a camper shell make such tasks difficult. Such times may also occur when a need arises for hauling cargo which may be too large to fit within the confines of the enclosed cargo bed, but which would otherwise fit if the camper shell were not installed.

A few selectively liftable camper shells have been devised to prevent camper shells from being a nuisance. In particular, camper shells have been devised which are selectively liftable so that they pivot out of the way while still remaining attached to a cargo bed. However, the conventional selectively liftable camper shells suffer from unique problems that are not experienced by mass market conventional stationary camper shells, i.e. camper shells which are either installed or removed from a cargo bed but are not selectively liftable. Hence, they have failed to achieve widespread commercial success.

One problem experienced by conventional selectively liftable camper shells concerns the use of an external forward brace or stationary section. This brace or section has heretofore been deemed necessary in order to cause the camper shell to pivot about an axis at the top, forward end of the shell. This direction of shell rotation is desirable because it keeps the camper shell confined over the outline of the pickup truck in a raised position for usability in confined spaces. The pivot axis at the top of the shell prevents the front of the shell from rotating forward into the back of a pickup cab. Instead, the front of the shell rotates rearward away from the cab.

This external forward brace or stationary section is a highly undesirable feature. It requires an inventory of different parts which are individually installed on the pickup. The use of a shell having separate parts leads to cost increases in manufacturing, shipping, stocking, and installing when compared to stationary camper shells.

In some situations the additional parts and complexity lead to a significantly heavier camper shell, and the use of different parts tends to cause a noisy implementation after the camper shell has been subjected to the rigors of time and the jostling of vehicular use. Moreover, the use of a multi-part camper shell tends to be incompatible with existing stationary camper shell designs and the expensive molds used in making existing stationary camper shells. Some multi-part shells tend to include external structures which interrupt the design lines of the pickup and shell so that aerodynamic characteristics and aesthetic qualities are degraded.

In one conventional implementation, a pivotal rear camper shell section rotates about a stationary front camper shell section. This implementation has reduced structural integrity compared to a stationary camper shell because the front section does not rigidly tie camper shell side walls together. In addition, security and protection from weather are reduced when compared to stationary camper shells if a flexible fabric section is used between the front and rear sections to accommodate movement between the sections.

Furthermore, conventional selectively liftable camper shells fail to provide sufficient structural integrity and latching devices to permit vehicular travel with the shell in a raised position. Consequently, such conventional shells fail to allow the hauling of cargo which may be too large to fit into an enclosed cargo bed when the shell is lowered.

SUMMARY OF THE INVENTION

Accordingly, it is an advantage of the present invention that an improved selectively liftable cargo bed enclosing system is provided.

Another advantage of the present invention is that the selectively liftable cargo bed enclosing system is compatible with existing stationary camper shell designs.

Another advantage is that the selectively liftable cargo bed enclosing system permits vehicular travel in either a raised or lowered position.

Another advantage is that the selectively liftable cargo bed enclosing system maintains the desirable stationary camper shell structure of a front section which rigidly attaches to a rear section so that a selectively liftable feature is provided without a penalty in structural integrity, security, or weather protection.

Another advantage is that a structure for implementing the selectively liftable feature is confined within the interior of a camper shell.

Another advantage is that a hinge structure is applied to a camper shell to cause the shell to pivot rearward and upward to clear a pickup cab.

The above and other advantages of the present invention are carried out in one form by a selectively liftable cargo bed enclosing system which covers a vehicle cargo bed and which selectively pivots away from said cargo bed. The system includes a camper shell having an interior surface. A substantially rigid upper arm pivotally attaches to the interior surface of the shell at an upper arm pivot point. A substantially rigid lower arm pivotally attaches to the interior surface of the shell at a lower arm pivot point. The lower arm pivot point is spaced apart from the upper arm pivot point, and the lower arm is shorter than the upper arm.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 2 shows a side view of the camper shell in the partially raised position;

FIG. 3 shows a side view of the camper shell in a lowered position;

FIG. 4 shows a cut-away perspective view of a first embodiment of a complex hinge used to pivot the camper shell rearward and upward to a raised position;

FIG. 5 shows a cut-away top view of the first embodiment of the complex hinge; and FIG. 6 shows a perspective view of a second embodiment of the complex hinge used to pivot the camper shell.

DETAILED DESCRIPTION OF THE PREFERRED EMBODIMENTS

Figure 1:
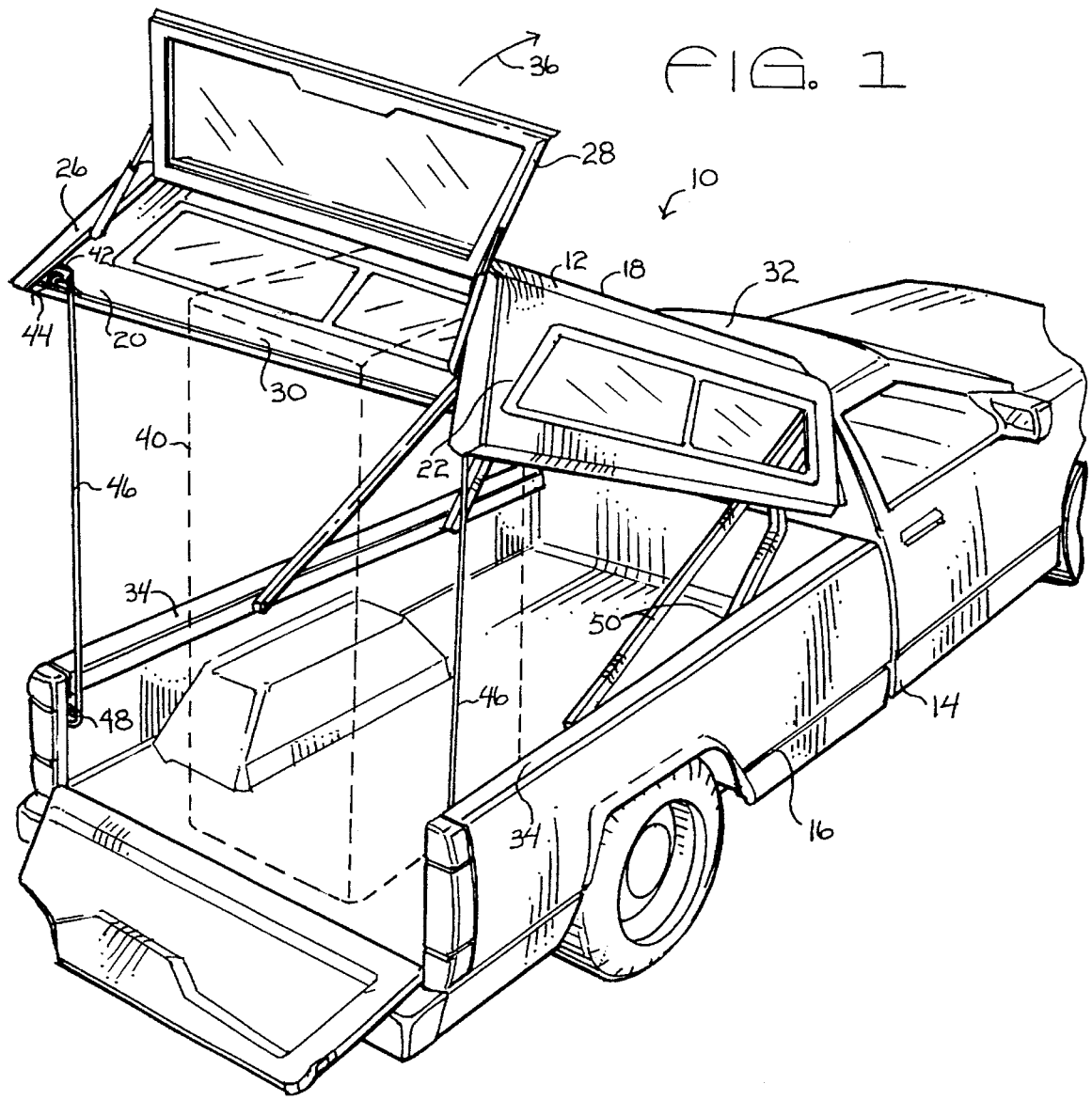
FIG. 1 shows a perspective view of a selectively liftable camper shell in a partially raised position.

FIG. 1 shows a perspective view of a selectively liftable cargo bed enclosing system 10. FIG. 2 shows a side view of system 10, and FIG. 3 shows a cut-away side view of system 10. System 10 includes a camper shell 12. Those skilled in the art will appreciate that camper shell 12 is a popular name for a cargo bed enclosure and that shell 12 need not actually have any relation to camping. Through a hinging mechanism (discussed below), shell 12 attaches to a pickup truck 14 or other vehicle or trailer having a cargo bed 16. The hinging mechanism allows shell 12 to pivot to a variety of positions relative to cargo bed 16. FIGS. 1 and 2 show shell 12 in a partially raised position, and FIG. 3 shows shell 12 in a lowered position.

Referring to FIGS. 1–3, shell 12 is similar in structure to a conventional stationary camper shell. Those skilled in the art will appreciate that stationary camper shells may be installed on a cargo bed or may be removed from a cargo bed but are not designed for other movement relative to the cargo bed. Shell 12 includes a roof 18, left and right side walls 20 and 22, respectively, a front wall 24, and a rear wall 26. Rear wall 26 may include a hinged door 28. With the exception of door 28, roof 18, left and right side walls 20 and 22, front wall 24 and rear wall 26 may be integrally formed together into a single relatively rigid unit. Thus, edges of shell 12 are formed between roof 18 and side walls 20 and 22, between roof 18 and front wall 24, and between front wall 24 and side walls 20 and 22.

Inner surfaces of roof 18, side walls 20 and 22, front wall 24, and rear wall 26 provide an interior surface 30 for shell 12. Side walls 20 and 22 may taper outward while extending away from roof 18, as shown in FIG. 1. The outward taper of side walls 20 and 22 is desirable because it allows camper shell 12 to follow the lines of a cab 32 portion of pickup truck 14 for aerodynamic and aesthetic enhancement. The hinging mechanism attaches to interior surface 30 of shell 12 and to an interior surface of cargo bed 16. Thus, the hinging mechanism is confined within the interior of shell 12 and bed 16. Since the hinging mechanism is confined within shell 12, no external brace or section is required to cause shell 12 to pivot. Conventional molding or sheet metal and frame construction techniques used for conventional stationary camper shells may also be used for shell 12. Shell 12 may, but need not, differ from conventional stationary camper shells by the inclusion of additional reinforcement materials where shell 12 attaches to the hinging mechanism.

In a lowered position, illustrated in FIG. 3, left and right side walls 20 and 22, front wall 24, and rear wall 26 of shell 12 rest directly on cargo bed 16 or a gasket (not shown) attached to a top surface 34 of cargo bed side rails. The hinging mechanism of system 10 is configured so that shell 12 pivots away from its lowered position in a rotation direction 36 so that a rear section of shell 12 rises above a front section of shell 12. Generally, the rear section resides closer to rear wall 26 and the front section resides closer to front wall 24. Rotational direction 36 is clockwise when facing pickup truck 14 and system 10 from the right side and counterclockwise when facing pickup truck 14 and system 10 from the left side.

Clamping fasteners 38 (see FIG. 3) may securely fasten shell 12 to cargo bed 16 when shell 12 is in its lowered position. Fasteners 38 may be positioned at rear, lower corners of shell 12 and corresponding locations on cargo bed 16, and may be configured as hasps. Fasteners 38 may optionally and additionally be positioned on forward, lower corners of shell 12.

Fasteners 38 may be unlatched to allow shell 12 to pivot in rotation direction 36 away from its lowered position. In a fully raised position (not shown) shell 12 may pivot farther away from its lowered position than is illustrated in the Figures. This fully raised position allows room for people to easily enter cargo bed 16 for cleaning, cargo loading, cargo unloading, and the like. The cargo may include a large item 40 (shown in phantom in FIGS. 1 and 2) which would not fit within cargo bed 16 with shell 12 in its lowered position. As an illustrative example, large cargo item 40 may be a refrigerator, or other large household appliance or item of furniture.

In a partially raised position, illustrated in FIGS. 1–2, shell 12 may serve to hold large cargo item 40 in place within cargo bed 16 as pickup truck 14 is driven. Thus, system 10 additionally operates as a cargo hold-down so that cargo item 40 cannot easily shift its position in response to vehicular movements. Downward clamping forces are applied to shell 12 when shell 12 pivots away from its lowered position through the use of clamping assemblies 42. Thus, item 40 becomes clamped between shell 12 and cargo bed 16. Two clamping assemblies 42 may be installed on the rear, interior surface 30 of shell 12.

In a preferred embodiment, each clamping assembly 42 includes a ratcheted take-up reel 44 attached to one end of a cable 46. Those skilled in the art will appreciate that cable 46 may be provided by any of a wide variety of flexible members, including wires, ropes, cords, straps, chains, and the like. A hook 48 attaches to another end of cable 46. Cable 46 may be extended from take-up reel 44 as needed to allow hook 48 to attach to any convenient hole or other feature within cargo bed 16. If needed, an eye (not shown) to which hook 48 mates may be bolted to the rear, interior sidewalls of cargo bed 16. Excess cable 46 may be wound on ratcheted take-up reel 44 until sufficient downward clamping force is applied to item 40 by shell 12. A ratcheting mechanism included in reel 44 prevents relaxation of this clamping force. When clamping assemblies 42 are not in use, cables 46 may be entirely wound onto take-up reels 44.

FIG. 4 shows a cut-away perspective view of a first embodiment of a hinging mechanism 50 used to pivot shell 12 relative to pickup bed 16. FIG. 5 shows a cut-away top view of a portion of the first embodiment of hinging mechanism 50. In the following description, certain items are either identical to or mirror images of other items. The following description distinguishes such items from their counterparts by the use of the lower case alphabetic characters "a" and "b" appended to a common reference number. When an alphabetic character is omitted, the following description refers to any one of such items and their counterparts individually or to both of them collectively.

Referring to FIGS. 4–5, hinging mechanism 50 includes left and right upper arms 52a and 52b, respectively, and left and right lower arms 54a and 54b, respectively. Upper arms 52 are desirably longer than lower arms 54. In the preferred embodiment, upper arms may be around 48 inches long while lower arms may be around 30 inches long. Left arms 52a and 54a are positioned on the left side of cargo bed 16 and shell 12 while right arms 52b and 54b are positioned on the right side of bed 16 and shell 12. Arms 52 and 54 are preferably constructed from a rigid material, such as square steel or aluminum tubing.

Left and right upper arms 52a and 52b pivotally attach to the inside of cargo bed 16 near top surface 34 at left and right upper arm lower pivot points 56a and 56b, respectively. Left and right upper arms 52a and 52b pivotally attach to interior surface 30 of shell 12 near front wall 24 and roof 18 at left and right upper arm upper pivot points 58a and 58b, respectively. Left and right lower arms 54a and 54b pivotally attach to the inside of cargo bed 16 near top surface 34 at left and right lower arm lower pivot points 60a and 60b, respectively. Left and right lower arms 54a and 54b pivotally attach to interior surface 30 of shell 12 near front wall 24 at left and right lower arm upper pivot points 62a and 62b, respectively. Pivot points 58 and 62 may actually attach to either side walls 20 and 22 or front wall 24 so long as pivot points 56, 58, 60, and 62 permit rotational motion about axes which extend in a left-right direction across shell 12 and cargo bed 16. Conventional pivotal attaching techniques may be used at pivot points 56, 58, 60, and 62.

Lower arm upper pivot points 62 reside vertically below upper arm upper pivot points 58. This causes lower arm upper pivot points 62 to be spaced apart from upper arm upper pivot points 58 in rotation direction 36. Conversely, lower arm lower pivot points 60 reside horizontally in front of upper arm lower pivot points 56. This causes lower arm lower pivot points 60 to be spaced apart from upper arm lower pivot points 56 in a direction opposite to rotation direction 36.

Outward ends 64 of left and right torsion springs 66a and 66b are restrained by left and right upper arms 52a and 52b, respectively. Springs 66 are desirably wound around a transverse rod 68, which extends roughly between upper pivot points 58. Inward ends 70 of springs 66 are restrained by a holding member 72 that attaches to interior surface 30 of shell 12. FIGS. 4–5 show holding member 72 attached to a central region of front wall 24 near roof 18.

In addition, arms 52 and 54 all have a bent, curved, or otherwise dogleg shape 74. Proceeding from upper pivot points 58 and 62, arms 52 and 54 reside at a relatively inward position but are bent to extend to a more outward position at lower pivot points 56 and 60. This dogleg shape 74 compensates for the outward taper of side walls 20 and 22 of shell 12 extending away from roof 18.

Torsion springs 66 are wound to apply a desirable amount of upward counterbalancing force to shell 12. The counterbalancing force is applied between holding member 72, which attaches to shell 12, and upper arms 52 so that shell 12 tends to pivot upward about upper arm upper pivot points 58. In one embodiment, this counterbalancing force is adjusted so that shell 12 naturally pivots upward as soon as fasteners 38 or clamping assemblies 42 are disengaged, but this amount of counterbalancing force is not a requirement of the present invention.

From the lowered position for shell 12, as shell 12 pivots upward about upper arm upper pivot points 58, front wall 24 of shell 12 pivots rearward. This rearward movement pushes lower arms 54 upward and rearward in an arc around lower arm lower pivot points 60. Desirably, lower arm upper pivot points 62 are spaced as far below upper arm upper pivot points 58 as possible so that lower arms 54 move as far rearward and upward as possible. In addition, the differences in the arcs traversed by points 58 and 62 about pivot point 56 and 60 become more pronounced as points 62 are spaced further apart from points 58. Spacing points 62 and 58 further apart leads to a structurally stable design in which the front section of system 10 remains secured in place while in its lowered position in spite of vehicular travel and jostling. In the preferred embodiment, this distance is around seven inches.

The movement of lower arms 54 rearward and upward causes shell 12 to move rearward and upward. The rearward component of this movement allows the exterior edge of shell 12 formed between roof 18 and front wall 24 to move a small distance forward while shell 12 pivots about upper arm upper pivot points 58 without contacting pickup cab 32. The upward component of this movement allows the rear section of shell 12 to pivot to a greater height than could otherwise be achieved. This greater height is sufficient to allow a refrigerator, for example, to be loaded into cargo bed 16.

As shell 12 continues to pivot upward about upper arm upper pivot points 58, shell 12 continues to move rearward and upward. Eventually a stop is reached when the central region of lower arms 54 contact front wall 24 of shell 12.

FIG. 6 shows a perspective view of a second embodiment of hinge mechanism 50. FIG. 6 illustrates only the left, front corner of cargo bed 16 and shell 12. However, the unseen right side has a similar structure. This second embodiment differs from the first embodiment illustrated in FIGS. 4–5 in that tension springs 76 are used to apply counterbalancing forces in lieu of torsion springs 66 (see FIGS. 4–5). In particular, a rigid pull bar 78 securely attaches to shell 12 and extends downward into cargo bed 16 from the front corners of shell 12. One end of tension spring 76 attaches to a lower end of pull bar 78. Another end of tension spring 76 attaches to a convenient location toward the rear sides of cargo bed 16. Spring 76 is configured to urge or pull the lower end of pull bar 78 toward the rear of cargo bed 16. As the lower end of pull bar 78 moves rearward, shell 12 pivots upward as discussed above in connection with FIGS. 4–5.

In summary, the present invention provides an improved selectively liftable cargo bed enclosing system. The selectively liftable cargo bed enclosing system is compatible with existing stationary camper shell designs, and it permits vehicular travel in either a raised or lowered position. In a raised or partially raised position, the enclosing system may serve as a hold-down for large cargo items. The selectively liftable cargo bed enclosing system maintains the desirable stationary camper shell structure of a front section which rigidly attaches to a rear section so that a selectively liftable feature is provided without a penalty in structural integrity, security, or weather protection. A hinging mechanism which implements the selectively liftable feature is confined within the interior of the shell. In addition, the hinge mechanism is configured to cause the shell to pivot rearward and upward to clear a pickup cab and gain increased height.

The present invention has been described above with reference to preferred embodiments. However, those skilled in the art will recognize that changes and modifications may be made in these preferred embodiments without departing from the scope of the present invention. For example, other types of counterbalancing systems, fasteners, clamping assemblies, and the like may be devised to accommodate substantially equivalent functions as described herein. Likewise, those skilled in the art will appreciate that relative directional terms, such as left, right, top, front, rear, and the like are used herein for consistency with the Figures and normal vehicular conventions and that such terms should not be viewed as limiting the scope of the present invention. These and other changes and modifications which are obvious to those skilled in the art are intended to be included within the scope of the present invention.

What is claimed is:

1. A selectively liftable cargo bed enclosing system which covers a vehicle cargo bed and which selectively pivots away from said cargo bed, said system comprising:

a camper shell having an interior surface;

a substantially rigid upper arm pivotally attached to said interior surface of said shell at an upper arm pivot point; and a substantially rigid lower arm pivotally attached to said interior surface of said shell at a lower arm pivot point, said lower arm pivot point being spaced apart from said upper arm pivot point, and said lower arm being shorter than said upper arm.

2. A cargo bed enclosing system as claimed in claim 1 additionally comprising:

a second upper arm pivotally attached to said interior surface of said shell at a second upper arm pivot point; and a second lower arm pivotally attached to said interior surface of said shell at a second lower arm pivot point, said second lower arm pivot point being spaced apart from said second upper arm pivot point, and said second lower arm being shorter than said second upper arm.

3. A cargo bed enclosing system as claimed in claim 1 wherein:

said shell has a roof, left and right side walls, and a front wall;

said upper and lower arm pivot points are located on said front wall or one of said side walls; and said lower arm pivot point resides below said upper arm pivot point.

4. A cargo bed enclosing system as claimed in claim 1 wherein:

said shell has a front wall and a rear section; and said upper and lower arm pivot points are arranged so that said rear section of said shell pivots above said front wall of said shell.

5. A cargo bed enclosing system as claimed in claim 1 additionally comprising means, attached to said shell, for counterbalancing said shell so that an upward force required to cause said shell to pivot away from said cargo bed is less than an upward force that would be required without said counterbalancing means.

6. A cargo bed enclosing system as claimed in claim 5 wherein said counterbalancing means comprises a spring.

7. A cargo bed enclosing system as claimed in claim 5 wherein said counterbalancing means comprises a tension spring.

8. A cargo bed enclosing system as claimed in claim 5 wherein said counterbalancing means comprises a torsion spring.

9. A cargo bed enclosing system as claimed in claim 8 wherein:

said shell has a roof and a front wall;

said torsion spring resides within said shell proximate said roof and front wall; and said torsion spring has a first end attached to said shell proximate the centers of said roof and front wall and a second end attached to said upper arm.

10. A cargo bed enclosing system as claimed in claim 1 additionally comprising means, coupled to said shell, for fastening said shell to said cargo bed when said shell has pivoted to a lowered position.

11. A cargo bed enclosing system as claimed in claim 1 wherein said shell has a rear section, and said system additionally comprises means, coupled to said shell proximate said rear section, for applying a downward clamping force when said shell has pivoted away from a lowered position.

12. A cargo bed enclosing system as claimed in claim 11 wherein said applying means comprises a ratcheted take-up reel having a cable attached thereto.

13. A selectively liftable cargo bed enclosing system as claimed in claim 1 wherein:

said shell has a roof which forms an edge with a side wall, and said side wall tapers outward as said side wall extends away from said roof;

said upper arm has a first end which pivotally attaches to said shell and has a second end; and said upper arm has a dogleg shape to compensate for said taper of said side wall.

14. A selectively liftable cargo bed enclosing system which covers a vehicle cargo bed and which selectively pivots away from said cargo bed in a rotational direction, said system comprising:

a camper shell having an interior surface;

a substantially rigid upper arm having upper and lower ends, said upper end of said upper arm being pivotally attached to said interior surface of said shell at an upper arm upper pivot point and said lower end of said upper arm being pivotally attached to said cargo bed at an upper arm lower pivot point; and a substantially rigid lower arm having upper and lower ends, said upper end of said lower arm being pivotally attached to said interior surface of said shell at a lower arm upper pivot point and said lower end of said lower arm being pivotally attached to said cargo bed at a lower arm lower pivot point; wherein said lower arm upper pivot point is spaced apart from said upper arm upper pivot point in substantially said rotational direction, said lower arm is shorter than said upper arm, and said lower arm lower pivot point is spaced apart from said upper arm lower pivot point in a direction substantially opposite to said rotational direction.

15. A cargo bed enclosing system as claimed in claim 14 wherein:

said shell has a roof, left and right side walls, and a front wall;

said upper and lower arm upper pivot points are located on said front wall or one of said side walls;

said lower arm upper pivot point resides below said upper arm upper pivot point; and said lower arm lower pivot point resides closer to said front wall than said upper arm lower pivot point.

16. A cargo bed enclosing system as claimed in claim 14 wherein:

said shell has a roof and a front wall; and said system additionally comprises a torsion spring positioned within said shell proximate said roof and front wall, said torsion spring having a first end attached to said shell proximate the centers of said roof and front wall and a second end attached to said upper arm.

17. A cargo bed enclosing system as claimed in claim 14 wherein said shell has a rear section, and said system additionally comprises:

first fastening means, coupled to said shell, for fastening said shell to said cargo bed when said shell has pivoted to a lowered position; and second fastening means, coupled to said shell proximate said rear section, for applying a clamping force between said shell and said cargo bed when said shell has pivoted away from said lowered position.

18. A cargo bed enclosing system as claimed in claim 17 wherein said second fastening means comprises a ratcheted take-up reel having a cable attached thereto.

19. A selectively liftable cargo bed enclosing system which covers a vehicle cargo bed and which selectively pivots away from said cargo bed in a rotational direction, said system comprising:

a camper shell having an interior surface and a rear section;

a substantially rigid upper arm pivotally attached to said interior surface of said shell at an upper arm pivot point;

a substantially rigid lower arm pivotally attached to said interior surface of said shell at a lower arm pivot point, said lower arm pivot point being spaced apart from said upper arm pivot point in substantially said rotational direction, and said lower arm being shorter than said upper arm;

means, attached to said shell, for counterbalancing said shell so that an upward force required to cause said shell to pivot away from a lowered position is less than an upward force that would be required without said counterbalancing means; and means, coupled to said shell proximate said rear section, for applying a downward clamping force when said shell has pivoted away from a lowered position.

20. A cargo bed enclosing system as claimed in claim 19 wherein:

said shell has a roof and a front wall; and said system additionally comprises a torsion spring positioned within said shell proximate said roof and front wall, said torsion spring having a first end attached to said shell proximate the centers of said roof and front wall and a second end attached to said upper arm.

* * * * *